United States Patent
Wu et al.

(10) Patent No.: US 9,940,522 B2
(45) Date of Patent: Apr. 10, 2018

(54) SYSTEMS AND METHODS FOR IDENTIFYING ACTIVITIES AND/OR EVENTS IN MEDIA CONTENTS BASED ON OBJECT DATA AND SCENE DATA

(71) Applicant: Disney Enterprises, Inc., Burbank, CA (US)

(72) Inventors: Zuxuan Wu, Shanghai (CN); Yanwei Fu, Pittsburgh, PA (US); Leonid Sigal, Pittsburgh, PA (US)

(73) Assignee: Disney Enterprises, Inc., Burbank, CA (US)

( * ) Notice: Subject to any disclaimer, the term of this patent is extended or adjusted under 35 U.S.C. 154(b) by 52 days.

(21) Appl. No.: 15/211,403

(22) Filed: Jul. 15, 2016

(65) Prior Publication Data
US 2017/0308753 A1    Oct. 26, 2017

Related U.S. Application Data

(60) Provisional application No. 62/327,951, filed on Apr. 26, 2016.

(51) Int. Cl.
*G06K 9/00*    (2006.01)

(52) U.S. Cl.
CPC ..... *G06K 9/00718* (2013.01); *G06K 9/00671* (2013.01); *G06K 2209/21* (2013.01)

(58) Field of Classification Search
USPC ........ 382/103, 203, 159, 199, 218; 340/565; 342/64; 244/3.15, 3.16; 348/143, 701; 375/240.01; 707/728, 803, 912; 706/11
See application file for complete search history.

(56) References Cited

U.S. PATENT DOCUMENTS

| | | | | |
|---|---|---|---|---|
| 5,341,142 A * | 8/1994 | Reis | ..................... | F41G 7/2226 244/3.15 |
| 6,687,404 B1 * | 2/2004 | Hull | ................... | G06K 9/00442 382/180 |
| 7,890,549 B2 * | 2/2011 | Elad | ....................... | G06Q 30/02 706/11 |
| 8,164,744 B2 * | 4/2012 | Narum | .................. | G01M 11/30 356/73.1 |
| 8,660,368 B2 * | 2/2014 | Datta | ................. | G06K 9/00778 382/103 |

(Continued)

OTHER PUBLICATIONS

Jiang, Yu-Gang, et al. *Exploiting Feature and Class Relationships in Video Categorization with Regularized Deep Neural Networks*, IEEE Transactions on Pattern Analysis and Machine Intelligence, Feb. 2015, pp. 1-22.

*Primary Examiner* — Anh H Do
(74) *Attorney, Agent, or Firm* — Farjami & Farjami LLP

(57) ABSTRACT

There is provided a system including a non-transitory memory storing an executable code and a hardware processor executing the executable code to receive a plurality of training contents depicting a plurality of activities, extract training object data from the plurality of training contents including a first training object data corresponding to a first activity, extract training scene data from the plurality of training contents including a first training scene data corresponding to the first activity, determine that a probability of the first activity is maximized when the first training object data and the first training scene data both exist in a sample media content.

20 Claims, 7 Drawing Sheets

(56) References Cited

U.S. PATENT DOCUMENTS 8,928,816 B2 *   1/2015   Fahn .................... G06K 9/6269
                                                      348/701
9,001,884 B2 *   4/2015   Garakani ............. G06K 9/0014
                                                      375/240.01

* cited by examiner

US 9,940,522 B2

SYSTEMS AND METHODS FOR IDENTIFYING ACTIVITIES AND/OR EVENTS IN MEDIA CONTENTS BASED ON OBJECT DATA AND SCENE DATA

RELATED APPLICATION(S)

The present application claims the benefit of and priority to a U.S. Provisional Patent Application Ser. No. 62/327,951, filed Apr. 26, 2016, which is hereby incorporated by reference in its entirety into the present application.

BACKGROUND

Video content has become a part of everyday life with an increasing amount of video content becoming available online, and people spending an increasing amount of time online. Additionally, individuals are able to create and share video content online using video sharing websites and social media. Recognizing visual contents in unconstrained videos has found a new importance in many applications, such as video searches on the Internet, video recommendations, smart advertising, etc. Conventional approaches to content identification rely on manual annotations of video contents, and supervised computer recognition and categorization. However, manual annotations and supervised computer processing are time consuming and expensive.

SUMMARY

The present disclosure is directed to systems and methods for identifying activities and/or events in media contents based on object data and scene data, substantially as shown in and/or described in connection with at least one of the figures, as set forth more completely in the claims.

DETAILED DESCRIPTION

Figure 1:
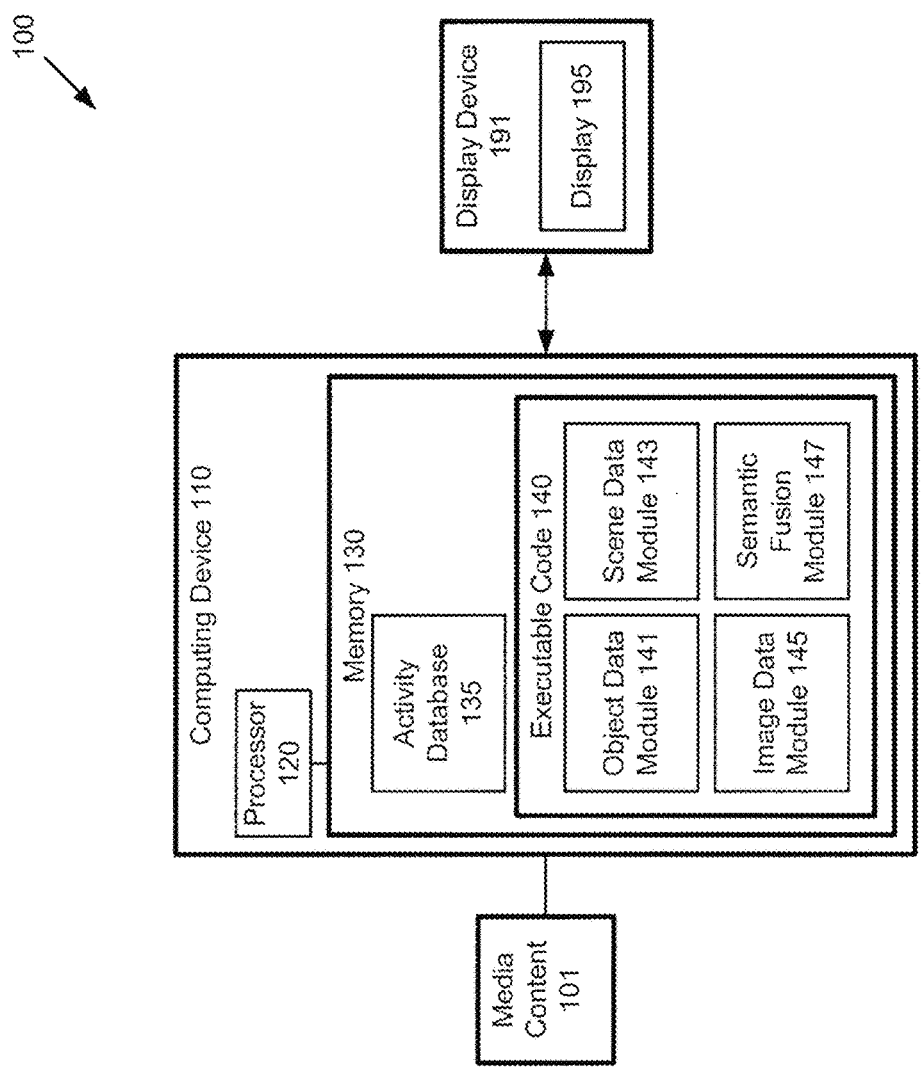
FIG. 1 shows a diagram of an exemplary system for identifying activities and/or events in media contents based on object data and scene data, according to one implementation of the present disclosure.

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

FIG. 1 shows a diagram of an exemplary system for identifying activities and/or events in media contents based on object data and scene data, according to one implementation of the present disclosure. System 100 includes media content 101, computing device 110, and display device 191. Media content 101 may be a video content including a plurality of frames, such as a television show, a movie, etc. Media content 101 may be transmitted using conventional television broadcasting, cable television, the Internet, etc. In some implementations, media content 101 may show activities involving various objects taking place in various scenes, such as a musical performance on stage, a skier skiing on a piste, a horseback rider riding a horse outside, etc.

Computing device 110 may be a computing device for processing videos, such as media content 101 and includes processor 120 and memory 130. Processor 120 is a hardware processor, such as a central processing unit (CPU), used in computing device 110. Memory 130 is a non-transitory storage device for storing computer code for execution by processor 120, and also storing various data and parameters. Memory 130 includes activity database 135 and executable code 140. Executable code 140 includes one or more software modules for execution by processor 120 of computing device 110. As shown in FIG. 1, executable code 140 includes object data module 141, scene data module 143, image data module 145, and semantic fusion module 147.

Object data module 141 is a software module stored in memory 130 for execution by processor 120 to extract object data from media content 101. In some implementations, object data module 141 may extract object data from media content 101. Object data may include properties of one or more objects, such as a color of the object, a shape of the object, a size of the object, a size of the object relative to another element of media content 101 such as a person, etc. Object data may include a name of the object. In some implementations, object data module 141 may extract the object data for video classification, for example, using a VGG-19 CNN model, which consists of sixteen (16) convolutional and three (3) fully connected layers. VGG-19 for object data module 141 may be pre-trained using a plurality of ImageNet object classes. ImageNet is an image database, available on the Internet, organized according to nouns in the WordNet hierarchy, in which each node of the hierarchy is depicted by thousands of images. Object data module 141 may transmit the output of the last fully connected layer (FC8) of the three (3) fully connected layers as the input for semantic fusion module 147. For example, for the j-th frame of video i, $f_{i,j}$, object data module 141 may output $f_{i,j} \alpha\ x_{i,j}^{O} \in R^{20574}$.

Scene data module 143 is a software module stored in memory 130 for execution by processor 120 to extract scene data from media content 101. In some implementations, scene data module 143 may extract scene data form media content 101. Scene data may include a description of a setting of media content 101, such as outdoors or stage. Scene data may include properties of the scene, such as lighting, location, identifiable structures such as a stadium, etc. In some implementations, scene data module 143 may extract the scene-related information to help video classification, for example, using a VGG-16 CNN model. VGG-16 consists of thirteen (13) convolutional layers and three (3) fully connected layers. The model may be pre-trained using Places 205 dataset which includes two hundred and five (205) scene classes and 2.5 million images. The Places 205 dataset is a scene-centric database commonly available on the Internet. Scene data module 143 may transmit the output of the last fully connected layer (FC8) of the three (3) fully connected layers as the input for semantic fusion module 147. For example, for the j-th frame of video i, $f_{i,j}$, scene data module 143 may output $f_{i,j} \propto x_{i,j}^{S} \in R^{205}$.

Image data module 145 is a software module stored in memory 130 for execution by processor 120 to extract image data from media content 101. In some implementations, image data module 145 may extract more generic visual information that may be directly relevant for video class prediction that object data module 141 and scene data module 143 may overlook by suppressing object/scene irrelevant feature information. In some implementations, image data may include texture, color, etc. Image data module 145 may use a VGG-19 CNN model pre-trained on the ImageNet training set. Image data module 145 may transmit features of the first fully connected layer of the three (3) fully connected layers as input to semantic fusion module 147. For example, for the j-th frame of video i, $f_{i,j}$, image data module 145 may output $f_{i,j} \propto x_{i,j}^{F} \in R^{4096}$.

Semantic fusion module 147 is a software module stored in memory 130 for execution by processor 120 to identify one or more activities and/or events included in media content 101. In some implementations, semantic fusion module 147 may use one or more of object data extracted from media content 101 by object data module 141, scene data extracted from media content 101 by scene data module 143, and image data extracted from media content 101 by image data module 145 to identify an activity included in media content 101. Semantic fusion module 147 may be composed of three layers neural network, including two hidden layers and one output layer, designed to fuse object data extracted by object data module 141, scene data extracted by scene data module 143, and image data extracted by image data module 145. Specifically, averaging the frames of each video from object data module 141, scene data module 143, and image data module 145 may generate video-level feature representation. In some implementations, such averaging may be done explicitly, or by a pooling operation that may be inserted between each of object data module 141, scene data module 143, and image data module 145, and the first layer of semantic fusion module 147. For example, video $V_i$ may be represented as $\bar{x}_i^{O} = \Sigma_{k=1}^{n_i} x_{i,k}^{O}$, $\bar{x}_i^{S} = \Sigma_{k=1}^{n_i} x_{i,k}^{S}$, $\bar{x}_i^{F} = \Sigma_{k=1}^{n_i} x_{i,k}^{F}$.

The averaged representations $\bar{x}_i^{O}, \bar{x}_i^{S}, \bar{x}_i^{F}$ may be fed into a first hidden layer of semantic fusion module 147, consisting of two-hundred and fifty (250), fifty (50), and two-hundred and fifty (250) neurons respectively for each module. Executable code 140 may use fewer neurons for scene data module 143 because it has fewer dimensions. The output of the first hidden layer may be fused by the second fully-connected layer across object data module 141, scene data module 143, and image data module 145. The second fully connected layer may include two-hundred and fifty (250) neurons. In some implementations, a softmax classifier layer may be added for video classification. The softmax layer may include a softamax function which may be a normalized exponential function used in calculating probabilities. Ground truth labels may be normalized the with $L_1$ norm when a sample has multiple labels. The function f(•) may indicate the non-linear function approximated by semantic fusion module 147 and $f_z(\bar{x}_i)$ may indicate the score of video instance $V_i$ belong to the class z. The most likely class label $\hat{z}_i$ of $V_i$ may be inferred as:

$$\hat{z}_i = \mathrm{argmax}_{z \in Z_{Tr}} f_z(\bar{x}_i) \qquad (1)$$

Display device 191 may be a device suitable for playing media content 101, such as a computer, a television, a mobile device, etc., and includes display 195.

Figure 2:
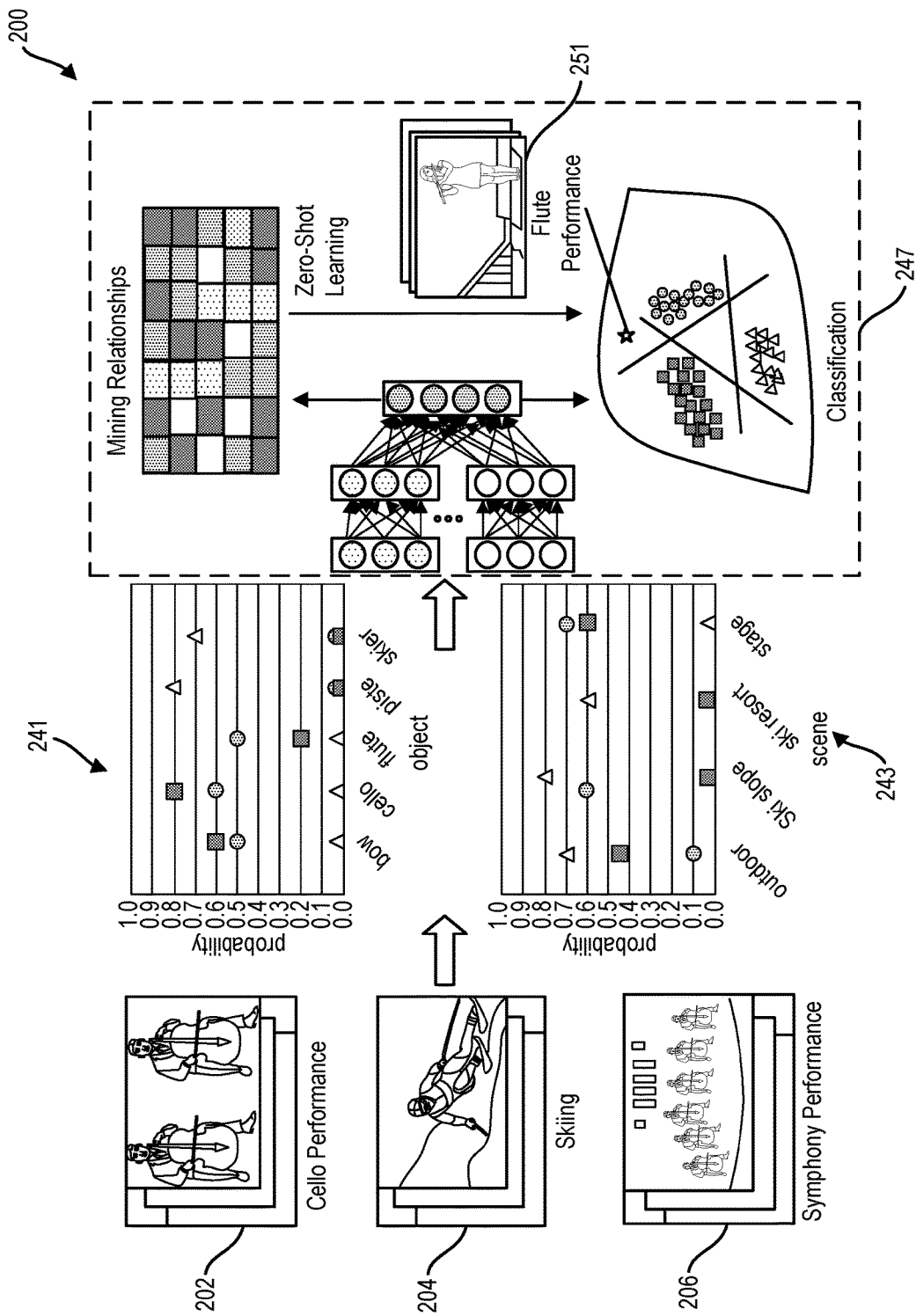
FIG. 2 shows a diagram of an exemplary process performed using the system of FIG. 1, according to one implementation of the present disclosure.

FIG. 2 shows a diagram of an exemplary process performed using the system of FIG. 1, according to one implementation of the present disclosure. Diagram 200 includes media content 202, media content 204, media content 206, object data table 241, scene data table 243, and semantic fusion network 247. Object data table 241 shows object data extracted from media contents 202, 204, and 206, namely bow, cello, flute, piste, and skier. Object data extracted from media content 202 is indicated in object data table 241 using squares to show the probability of a media content depicting each of the object classes. As shown in FIG. 2, object data table 241 indicates media content 202 has a probability of 0.6 corresponding to bow, a probability of 0.8 corresponding to cello, a probability of 0.2 corresponding to flute, and a probability of 0.0 for both piste and skier. Object data extracted from media content 204 is indicated in object data table 241 using triangles to show the probability of media content 204 depicting each of the object classes. As shown in FIG. 2, object data table 241 indicates media content 204 has a probability of 0.0 corresponding to each of bow, cello, flute, a probability of 0.8 corresponding to piste, and a probability of 0.7 corresponding to skier. Object data extracted from media content 206 is indicated in object data table 241 using circles to show the probability of media content 206 depicting each of the object classes. As shown in FIG. 2, object data table 241 indicates media content 206 has a probability of 0.5 corresponding to bow, a probability of 0.6 corresponding to cello, a probability of 0.5 corresponding to flute, and a probability of 0.0 for both piste and skier.

Scene data table 243 shows scene data extracted from media contents 202, 204, and 206, namely outdoor, ski slope, ski resort, and stage. Scene data extracted from media content 202 is indicated in scene data table 243 using squares to show the probability of a media content depicting each of the scene classes. As shown in FIG. 2, scene data table 243 indicates media content 202 has a probability between 0.4 and 0.5 corresponding to outdoor, a probability of 0.0 corresponding to both ski slope and ski resort, and a probability of 0.6 corresponding to stage. Scene data extracted from media content 204 is indicated in scene data table 243 using triangles to show the probability of media content 204 depicting each of the scene classes. As shown in FIG. 2, scene data table 243 indicates media content 204 has a probability of 0.7 corresponding to outdoor, a probability of 0.8 corresponding to ski slope, a probability of 0.6 corresponding to ski resort, and a probability of 0.0 corresponding to stage. Scene data extracted from media content 206 is indicated in scene data table 243 using circles to show the probability of media content 206 depicting each of the scene classes. As shown in FIG. 2, scene data table 243 indicates media content 206 has a probability of 0.1 corresponding to outdoor, a probability of 0.0 corresponding to both ski slope and ski resort, and a probability of 0.6 corresponding to stage.

In some implementations, the probabilities from object data table 241 and scene data table 243 may be used as input for semantic fusion network 247. Semantic fusion network 247 may identify activities and/or events depicted in media contents based on the extracted object data and scene data. In some implementations, semantic fusion network 247 may identify an activity for which semantic fusion network 247 has not been trained based on the object data and scene data extracted from an input media content, such as identifying flute performance 251 based on object data extracted from flute performance 251, scene data performance extracted from flute performance 251, and system training based on media contents 202, 204, and 206. Identifying an activity depicted in a media content may include mining object and scene relationships from training data and classifying activities and/or events based on extracted object data and extracted scene data.

Figure 3:
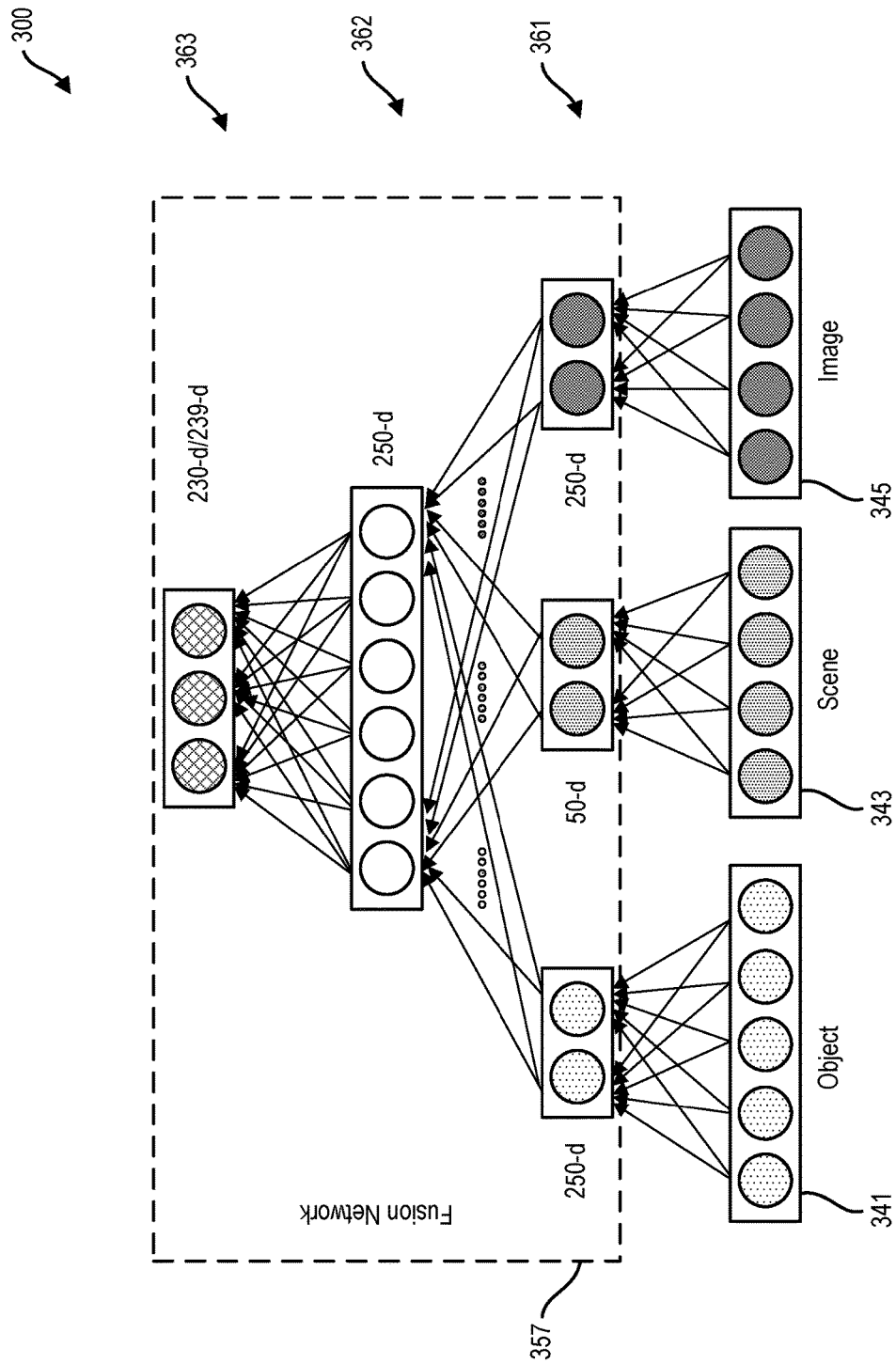
FIG. 3 shows a diagram of an exemplary process performed using the system of FIG. 1, according to one implementation of the present disclosure.

FIG. 3 shows a diagram of an exemplary process performed using the system of FIG. 1, according to one implementation of the present disclosure. Diagram 300 shows object data 341, scene data 343, and image data 345 as input into fusion network 357. Fusion network 357 may be a multi-layered neural network for classifying actions in an input media content. Fusion network 357 may be composed of a three-layer neural network including two hidden layers and one output layer. Fusion network 357 may be designed to fuse object data 341, scene data 343, and image data 345. Video-level feature representation may be generated by averaging the frames of each input media content for each of object data 341, scene data 343, and image data 345. The averaged representations of object data 341, scene data 343, and image data 345 may be fed into a layer 361 of fusion network 357. In some implementations, layer 361 may consist of two-hundred and fifty (250) neurons for object data 341, fifty (50) neurons for scene data 343, and two-hundred and fifty (250) neurons for image data 345, totaling five hundred and fifty (550) neurons. Fusion network 357 may use fewer neurons for scene data 343 because scene data 343 may have fewer dimensions. The output of layer 361 may be fused by layer 362, which may include a two-hundred and fifty (250) neuron fully connected layer across object data 341, scene data 343, and image data 345. In some implementations, layer 363 may include a softmax classifier layer for video classification.

Figure 4:
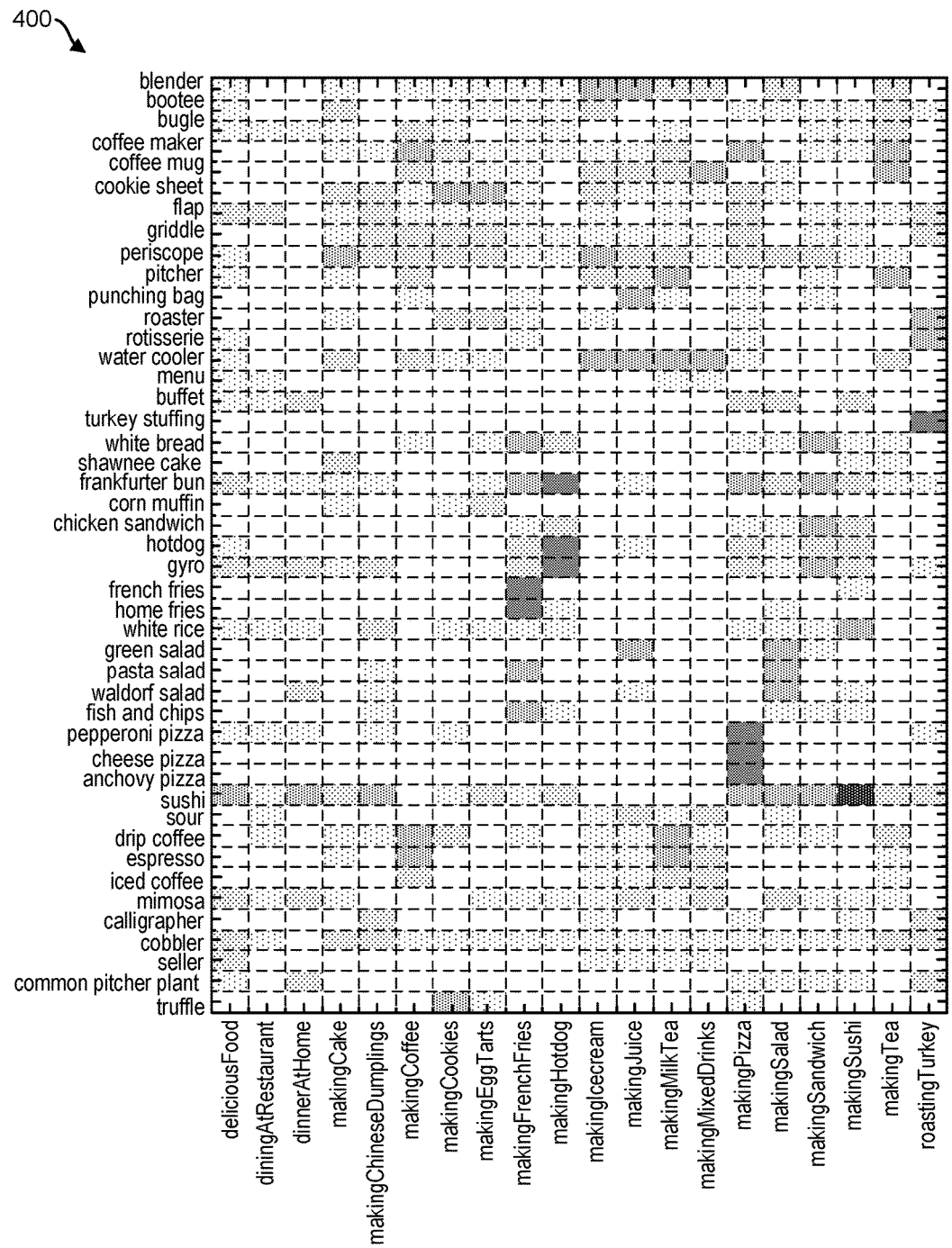
FIG. 4 shows a diagram of an exemplary data visualization table depicting relationships between various objects and various activities, according to one implementation of the present disclosure.

FIG. 4 shows a diagram of an exemplary data visualization table depicting relationships between various objects and various activities, according to one implementation of the present disclosure. Table 400 shows a data visualization depicting the correlation between various objects and activities that may be depicted in media content 101. The horizontal axis of data table 400 shows various activities, and the vertical axis of data table 400 shows various objects. Each cell in data table 400 represents the coincidence of the corresponding object in the corresponding activity class, and each cell is shaded to indicate the probability of the corresponding object appearing in the corresponding activity class. The darker the shading of a cell, the greater the probability that the presence of the corresponding object indicates the corresponding activity. For example, the cell at the intersection of the object pepperoni pizza and the activity making coffee is un-shaded because the presence of a pepperoni pizza in media content 101 would not make it likely that the activity being shown in media content 101 is making coffee. However, the cell at the intersection of the object sushi and the activity making sushi is shaded very dark because the presence of the object sushi in media content 101 would make it substantially more likely that the activity being shown in media content 101 is making sushi.

Figure 5:
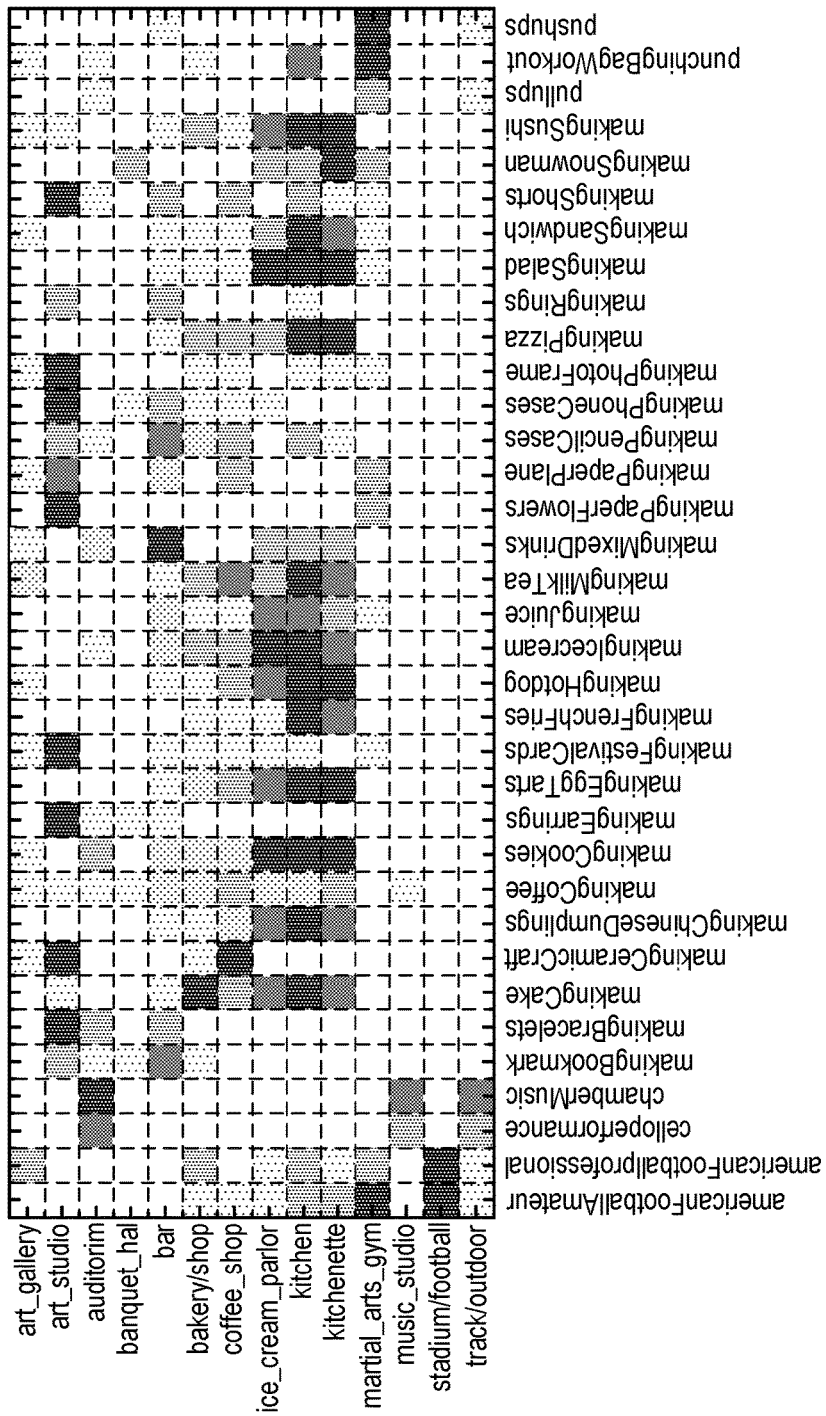
FIG. 5 shows a diagram of an exemplary data visualization table depicting relationships between various scenes and various activities, according to one implementation of the present disclosure.

FIG. 5 shows a diagram of an exemplary data visualization table depicting relationships between various scenes and various activities, according to one implementation of the present disclosure. Table 500 shows a data visualization depicting the correlation between various scenes and activities that may be depicted in media content 101. Each cell in data table 500 represents the coincidence of the corresponding scene in the corresponding activity class, and each cell is shaded to indicate the probability of the corresponding scene appearing in the corresponding activity class. The darker the shading of a cell, the greater the probability that the presence of the corresponding object indicates the corresponding activity. For example, the cell at the intersection of the scene kitchenette and the activity making bracelets is un-shaded because the scene showing a kitchenette in media content 101 would not make it likely that the activity being shown in media content 101 is making bracelets. However, the cell at the intersection of the scene kitchenette and the activity making cake is shaded very dark because the scene showing a kitchenette in media content 101 would make it substantially more likely that the activity being shown in media content 101 is making cake.

Figure 6:
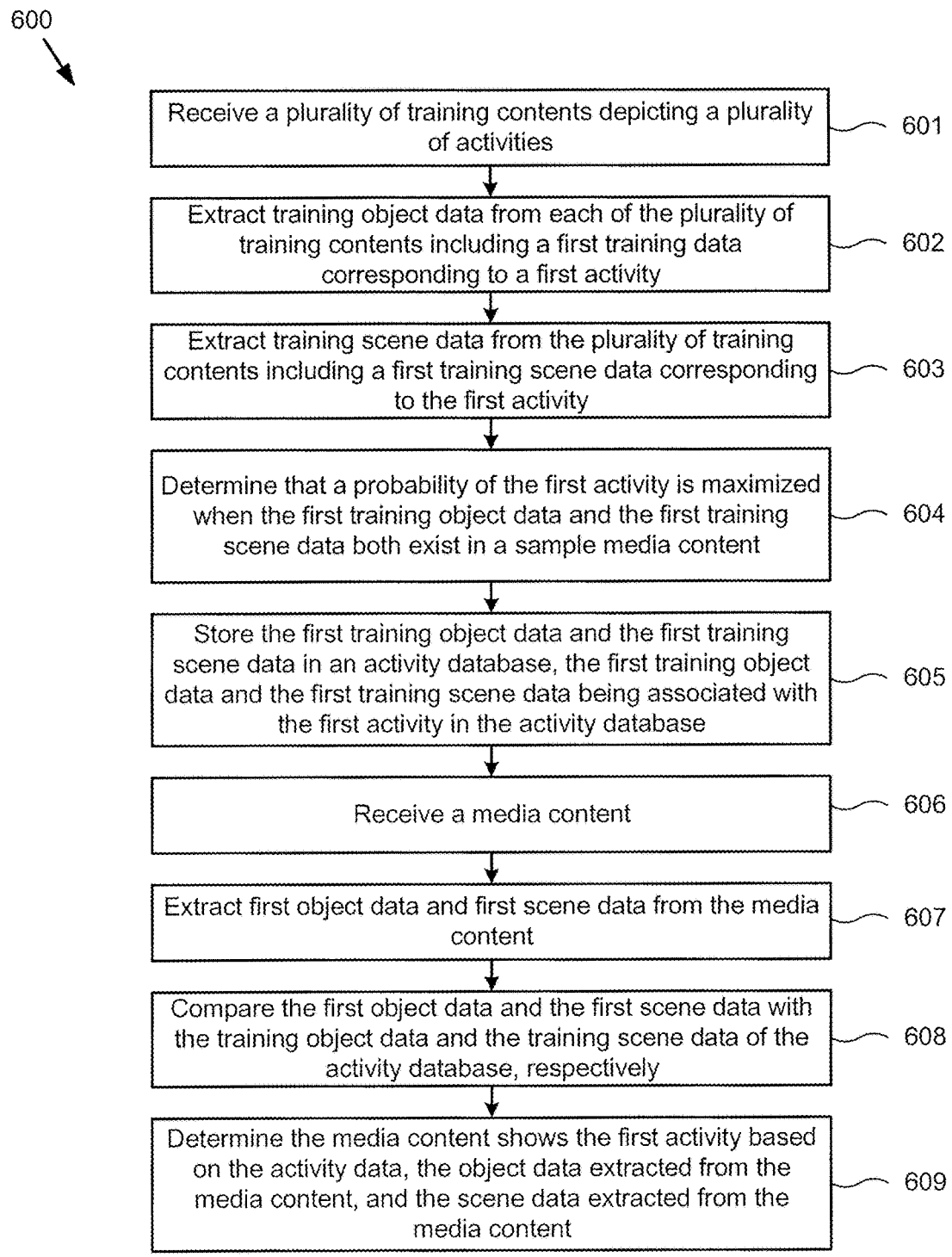
FIG. 6 shows a flowchart illustrating an exemplary method of identifying activities and/or events in media contents based on object data and scene data, according to one implementation of the present disclosure.

FIG. 6 shows a flowchart illustrating an exemplary method of identifying activities and/or events in media contents based on object data and scene data, according to one implementation of the present disclosure. Method 600 begins at 601, where executable code 140 receives a plurality of training contents depicting a plurality of activities and/or events. Training data may include existing data sets commonly available datasets such as ImageNet, which is an image database organized according to nouns in the WordNet hierarchy, in which each node of the hierarchy is depicted by thousands of images. The ImageNet database may be available on the Internet.

At 602, executable code 140 extracts training object data from the plurality of training contents including a first training object data corresponding to a first activity. Object data module 141 may extract the object-related information for video classification, for example, using a VGG-19 CNN model, which consists of sixteen (16) convolutional and three (3) fully connected layers. VGG-19 for object data module 141 may be pre-trained using a plurality of ImageNet object classes. In some implementations, object data module 141 may transmit the output of the last fully connected layer (FC8) of the three (3) fully connected layers as the input for semantic fusion module 147. For example, for the j-th frame of video i, $f_{i,j}$, object data module 141 may output $f_{i,j} \propto x_{i,j}^O \in R^{20574}$.

At 603, executable code 140 extracts training scene data from the plurality of training contents including a first training scene data corresponding to the first activity. In some implementations, scene data module 143 may extract the scene-related information to help video classification, for example, using a VGG-16 CNN model. VGG-16 consists of thirteen (13) convolutional layers and three (3) fully connected layers. The model may be pre-trained using Places 205 dataset, which includes two hundred and five (205) scene classes and 2.5 million images. The Places 205 dataset is a scene-centric database commonly available on the Internet. Scene data module 143 may transmit the output of the last fully connected layer (FC8) of the three (3) fully connected layers as the input for semantic fusion module 147. For example, for the j-th frame of video i, $f_{i,j}$, scene data module 143 may output $f_{i,j} \propto x_{i,j}^S \in R^{205}$.

In some implementations, executable code 140 may extract image data from media content 101. In some implementations, image data module 145 may extract more generic visual information that may be directly relevant for video class prediction that object data module 141 and scene data module 143 may overlook by suppressing object/scene irrelevant feature information. Image data module 145 may extract features such as texture, color, etc. from media content 101. Image data module 145 may use a VGG-19 CNN model pre-trained on the ImageNet training set. Image data module 145 may transmit features of the first fully connected layer of the three (3) fully connected layers as input to semantic fusion module 147. For example, for the j-th frame of video i, $f_{i,j}$, image data module 145 may output $f_{i,j} \propto x_{i,j}^F \in R^{4096}$.

At 604, executable code 140 determines that a probability of the first activity is maximized when the first training object data and the first training scene data both exist in a sample media content. After training, executable code 140 may identify a correlation between objects/scenes and video classes. Executable code 140 may let $f_z(\bar{x}_i)$ represent the score of the class z computed by semantic fusion module 147 for video $V_i$ in order to find an $L_2$-regularized feature representation, such that the score $f_z(\bar{x}_i)$ is maximized with respect to object or scene:

$$\hat{x}_z^k = \underset{\bar{x}_i^k}{\operatorname{argmax}} f_z(\bar{x}_i) - \lambda \|\bar{x}_i^k\|_2 \quad (2)$$

where $\lambda$ is the regularization parameter and $k \in \{O, S\}$. The locally-optimal representation $\bar{x}_i^k$ may be obtained using a back-propagation method with randomly initialized $\bar{x}_i$. By maximizing the classification score of each class, executable code 140 may find the representative object data associated with each activity class and scene data associated with each activity class. In some implementations, executable code 140 may obtain object data and/or scene data semantic representation (OSR) matrices:

$$\Pi^k = [(\hat{x}_z^k)^T]_z; k \in \{O, S\} \quad (3)$$

At 605, executable code 140 stores the first training object data and the first training scene data in activity database 135, the first training object data and the first training scene data being associated with the first activity in activity database 135. Method 600 continues at 606, where executable code 140 receives media content 101. Media content 101 may be a media content including a video depicting one or more activities. In some implementations, media content 101 may be a television input, such as a terrestrial television input, cable television input, an internet television input, etc. In other implementations, media content 101 may include a streamed media content, such as a movie, a video streamed from an online video service and/or streamed from a social networking website, etc.

At 607, executable code 140 extracts first object data and first scene data from media content 101. Object data module 141 may extract object data from media content 101. In some implementations, object data module 141 may extract object information related to one or more objects depicted in media content 101, such as a football ball depicted in a football game, a cello depicted in an orchestra, a skier depicted in a ski video, etc. Scene data module 143 may extract scene information depicted in media content 101, such as scene data of a football field shown in a football game, a stage shown in an orchestra performance, a snowy mountain range shown in a ski video, etc.

At 608, executable code 140 compares the first object data and the first scene data with the training object data and the training scene data of activity database 135, respectively. In some implementations, when media content 101 depicts an orchestra performance, semantic fusion module 147 may compare the object data of a cello and the scene data of a stage with activity data stored in activity database 135 to identify one or more activities that include cellos and a stage. Semantic fusion module 147 may identify one or more activities in activity database 135 including cello and stage. Method 600 continues at 609, where executable code 140 determines that media content 101 probably shows the first activity when the comparing finds a match for both the first object data and the first scene data in activity database 135. In some implementations, when semantic fusion module 147 identifies more than one activity corresponding to the object data extracted from media content 101 and the scene data extracted from media content 101, semantic fusion module 147 may identify the activity that has the highest probability of being depicted by the combination of objects and scenes shown in media content 101.

Figure 7:
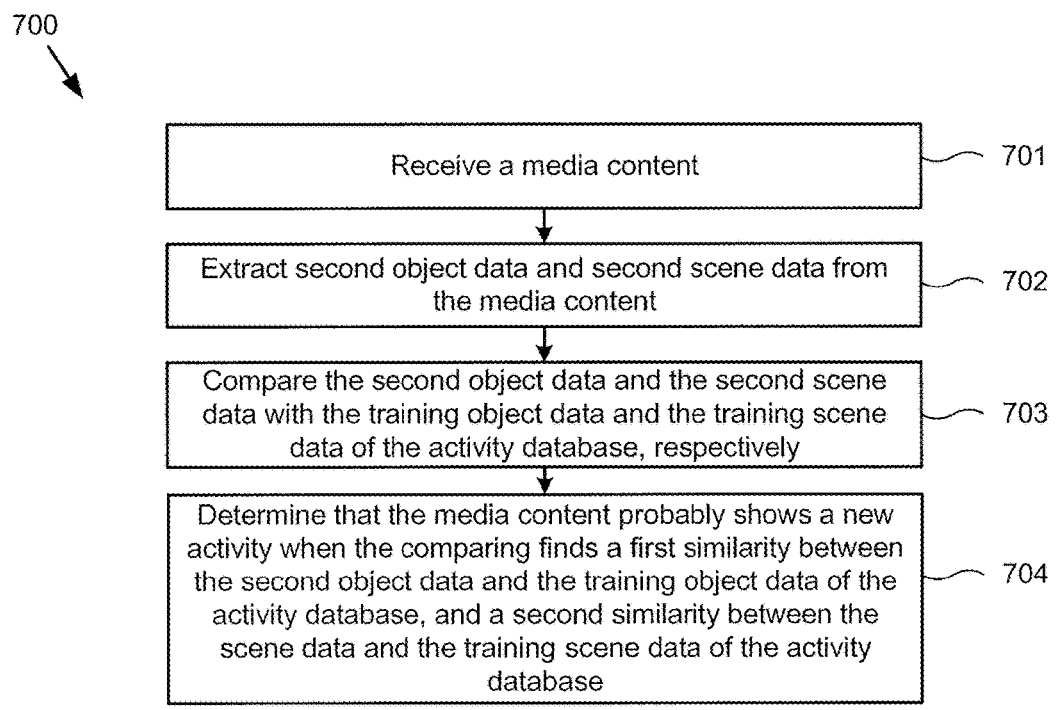
FIG. 7 shows a flowchart illustrating an exemplary method of identifying new activities and/or events in media contents based on object data and scene data, according to one implementation of the present disclosure.

FIG. 7 shows a flowchart illustrating an exemplary method of identifying new activities and/or events in media contents based on object data and scene data, according to one implementation of the present disclosure. Method 700 begins at 701, where executable code 140 receives media content 101. Media content 101 may be a media content including a video depicting one or more activities and/or events. In some implementations, media content 101 may be a television input, such as a terrestrial television input, cable television input, an internet television input, etc. In other implementations, media content 101 may include a streamed media content, such as a movie, a video streamed from an online video service and/or streamed from a social networking website, etc. In some implementations, media content 101 may show a new activity where a new activity is an activity for which executable code 140 has not been trained, and the new activity is not included in activity database 135. For example, activity database 135 may include object data for the sports of soccer and rugby, but not for American football, and media content 101 may depict American football.

At 702, executable code 140 extracts second object data and second scene data from media content 101. In some implementations, object data module 141 may extract object data corresponding to an American football and/or helmets used in playing American football. Scene data module 143 may extract scene data depicting a stadium in which American football is played and/or the uprights used to score points by kicking a field goal in American football. Method 700 continues at 703, where executable code 140 compares the second object data and the second scene data with the training object data and the training scene data of activity database 135, respectively. For example, semantic fusion module 147 may compare the object data of the American football with object data in activity database 135. During the comparison, semantic fusion module 147 may identify a soccer ball and a rugby ball in activity database 135, but may not identify an American football. Similarly, the comparison may identify a soccer stadium and a rugby field, but not an American football stadium.

At 704, determines that the media content probably shows a new activity when the comparing finds a first similarity between the second object data and the training object data of activity database 135, and a second similarity between the scene data and the training scene data of activity database 135. For example, semantic fusion module 147 may determine that media content 101 depicts a new activity because semantic fusion module 147 did not find a match for American football or American football stadium in activity database 135. In some implementations, executable code 140 may receive one or more instructions from a user describing a new activity and determine that media content 101 depicts the new activity based on the new object data extracted from media content 101, the new scene data extracted from media content 101, and the one or more instructions.

From the above description, it is manifest that various techniques can be used for implementing the concepts described in the present application without departing from the scope of those concepts. Moreover, while the concepts have been described with specific reference to certain implementations, a person having ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A system comprising:
a non-transitory memory storing an executable code; and
a hardware processor executing the executable code to:
receive a plurality of training contents depicting a plurality of activities;
extract training object data from the plurality of training contents including a first training object data corresponding to a first activity;
extract training scene data from the plurality of training contents including a first training scene data corresponding to the first activity; and
determine that a probability of the first activity is maximized when the first training object data and the first training scene data both exist in a sample media content.

2. The system of claim 1, wherein the plurality of training contents include at least one of object annotations, scene annotations, and activity annotations.

3. The system of claim 1, wherein the hardware processor further executes the executable code to:
store the first training object data and the first training scene data in an activity database, the first training object data and the first training scene data being associated with the first activity in the activity database.

4. The system of claim 3, wherein the hardware processor further executes the executable code to:
receive a media content;
extract first object data from the media content;
extract first scene data from the media content;
compare the first object data and the first scene data with the training object data and the training scene data of the activity database, respectively; and
determine that the media content probably shows the first activity when the comparing finds a match for both the first object data and the first scene data in the activity database.

5. The system of claim 4, wherein the media content includes at least one of object annotations, scene annotations, and activity annotations.

6. The system of claim 4, wherein the first object data includes at least one of a color and a shape.

7. The system of claim 4, wherein the first scene data includes a location.

8. The system of claim 3, wherein the hardware processor further executes the executable code to:
receive a media content;
extract second object data from the media content;
extract second scene data from the media content;
compare the second object data and the second scene data with the training object data and the training scene data of the activity database, respectively; and
determine that the media content probably shows a new activity when the comparing finds a first similarity between the second object data and the training object data of the activity database, and a second similarity between the scene data and the training scene data of the activity database.

9. The system of claim 8, wherein, prior to the determining, the hardware processor executes the executable code to:
receive a new activity instruction describing the new activity; and
include the new activity instruction when determining the media content probably shows the new activity.

10. A method for use with a system including a non-transitory memory and a hardware processor, the method comprising:
receiving, using the hardware processor, a plurality of training contents depicting a plurality of activities;
extracting, using the hardware processor, training object data from the plurality of training contents including a first training object data corresponding to a first activity;
extracting, using the hardware processor, training scene data from the plurality of training contents including a first training scene data corresponding to the first activity; and
determining, using the hardware processor, a probability is maximized that the first activity is shown when the first training object data and the first training scene data are both included in a sample media content.

11. The method of claim 10, wherein the plurality of training contents include at least one of object annotations, scene annotations, and activity annotations.

12. The method of claim 10, further comprising:
storing, in the non-transitory memory, the first training object data and the first training scene data in an activity database, the first training object data and the first training scene data being associated with the first activity in the activity database.

13. The method of claim 10, further comprising:
receiving, using the hardware processor, a media content;
extracting, using the hardware processor, object data from the media content;
extracting, using the hardware processor, scene data from the media content;
comparing, using the hardware processor, the first object data and the first scene data with the training object data and the training scene data of the activity database, respectively; and
determining, using the hardware processor, that the media content probably shows the first activity when the comparing finds a match for both the first object data and the first scene data in the activity database.

14. The method of claim 13, wherein the media content includes at least one of object annotations, scene annotations, and activity annotations.

15. The method of claim 13, wherein determining the media content shows the first activity includes identifying the first activity as the most probable activity indicated by the first activity data.

16. The method of claim 13, wherein the first object data includes at least one of a color and a shape.

17. The method of claim 13, wherein the first scene data includes a location.

18. The method of claim 12, further comprising:
receiving, using the hardware processor, a media content;
extracting, using the hardware processor, second object data from the media content;
extracting, using the hardware processor, second scene data from the media content;
comparing, using the hardware processor, the second object data and the second scene data with the training object data and the training scene data of the activity database, respectively; and
determining, using the hardware processor, that the media content probably shows a new activity when the comparing finds a first similarity between the second object data and the training object data of the activity database, and a second similarity between the scene data and the training scene data of the activity database.

19. The method of claim 18, wherein, prior to the determining, the method further comprises:
receiving, using the hardware processor, a new activity instruction describing the new activity; and
including, using the hardware processor, the new activity instruction when determining the media content probably shows the new activity.

20. A system for determining whether a media content includes a first activity using an activity database, the activity database including activity object data and activity scene data for a plurality of activities including the first activity, the system comprising:
a non-transitory memory storing an activity identification software;
a hardware processor executing the activity identification software to:
receive a first media content including a first object data and a first scene data;
compare the first object data and the first scene data with the activity object data and the activity scene data of the activity database, respectively; and
determine that the first media content probably includes the first activity when the comparing finds a match for both the first object data and the first scene data in the activity database.

* * * * *